UNITED STATES PATENT OFFICE.

ERIK ÖMAN, OF STOCKHOLM, SWEDEN.

PROCESS OF PRODUCING SULFITE CELLULOSE.

1,130,192.  Specification of Letters Patent.  Patented Mar. 2, 1915.

No Drawing.  Application filed January 19, 1914. Serial No. 813,129.

*To all whom it may concern:*

Be it known that I, ERIK ÖMAN, a citizen of the Kingdom of Sweden, residing at Stockholm, Sweden, have invented new and useful Improvements in Processes of Producing Sulfite Cellulose, of which the following is a specification.

Various attempts have hitherto been made in order to utilize economically the substances contained in the waste liquor obtained by boiling sulfite cellulose. In boiling sulfite cellulose more than half of the weight of the wood is dissolved and carried away together with the liquor, and, besides, large quantities of lime and sulfur are also wasted. From such waste sulfite liquor a plurality of substances have been produced. All attempts to recover economically and extensively the constituents of the waste liquor have, however, miscarried hitherto, as far as known, owing to the high degree of dilution of the waste liquor. It has only been possible to recover the fermentable kinds of sugar contained in the waste liquor for producing alcohol. The small percentage of substances (organic as well as inorganic substances) dissolved in the waste liquor has always been and will always be the most serious hindrance to the economical utilizing of the substances contained in the waste liquor.

The present invention has for its object to remove said hindrance.

The invention consists in this that the waste liquor (instead of fresh water) is used for preparing fresh boiling acid by adding lime or magnesia or alkali and sulfur dioxid to the liquor, the boiling liquor thus obtained being used for another boiling of splinters. Of course, the waste liquor obtained in this manner contains about twice as much of the dissolved substances as the common waste liquor. The waste liquor thus obtained may be used anew for preparing fresh boiling acid, and by boiling with this acid a waste liquor is obtained of a concentration of about three times as great as that of common waste liquor, etc. In this manner a waste liquor may be obtained, without difficulty, being three to four times as concentrated as the common waste liquor, and nevertheless the incrustations may be extracted from the wood in a satisfactory manner.

In carrying the invention into practice one may proceed in various manners; the following process is, however, to be preferred. When the waste liquor, by the use of old liquor for preparing fresh boiling acid, has attained the desired concentration, part of said liquor is used for recovering the organic or inorganic substances contained therein, and the remainder of the waste liquor is used for preparing fresh boiling acid by adding further quantities of lime or magnesia or alkali together with sulfur dioxid. Besides waste liquor, one may, preferably, use a suitable quantity of the washing-water, which is obtained by washing of the pulp, or a suitable quantity of pure water or washing-water as well as pure water, thereby effecting a suitable dilution of the concentrated liquor before using it for another boiling process. At the beginning of the process, ere the waste liquor has attained the desired concentration, such a dilution is, of course, to be obviated.

The advantages of the present invention consist, on the one hand, in this that a waste liquor of such concentration is obtained that an economical utilization thereof will be possible, on the other hand that the quantity of the pulp obtained will be greater, and finally that the corroding influence of the boiling liquor on the digesters and the conduits, etc., will be less than otherwise.

From the comparatively concentrated waste liquor obtained in this manner the dissolved substances may be recovered either by first transforming the fermentable substances into alcohol and distilling the same, the remainder of the dissolved substances then being recovered by precipitating or concentrating, or by first removing, wholly or partly, the dissolved not fermentable substances and then transforming the fermentable substances into alcohol which is distilled afterward.

The present process is especially adapted to the manufacturing of strong pulp or half-cellulose, because the extraction of the incrustations from the wood may in this process be regulated more easily than in the usual boiling of sulfite cellulose. In the latter process the acid affects, at the beginning of the boiling, the fibers of the cellulose as well as the incrustations, which involves a loss of cellulose, and, moreover, a part of the splinters will be dissolved completely, which is not to be desired. In this manner one obtains, consequently, on the one hand fibers of cellulose totally freed from incrustations and on the other hand parts freed from incrustations to such an extent that they are capable of being defibrated. A pulp of this kind is not, however homogeneous and, on account thereof, of less value. In using the present process the said inconveniences are obviated because the cellulose is not affected at the beginning of the boiling process, and besides it will be possible, by suitably adjusting the quantity of lime or magnesia or alkali relative to the quantity of wood, to control completely the degree of boiling, the pulp, moreover, being practically homogeneous.

Having now described my invention, what I claim as new and desire to secure by Letters Patent is:

1. In the process of boiling sulfite cellulose, a method consisting in adding a basic agent and sulfur dioxid to waste liquor obtained by previous boiling, and using the waste liquor thus prepared for boiling another quantity of wood, substantially as and for the purpose set forth.

2. In the process of boiling sulfite cellulose, a method consisting in adding a basic agent and sulfur dioxid to waste liquor obtained by previous boiling, using the waste liquor thus prepared for boiling another quantity of wood, and repeating the said operations until the waste liquor has attained the desired concentration with reference to the substances dissolved, substantially as and for the purpose set forth.

3. In the process of boiling sulfite cellulose, a method consisting in adding a basic agent, sulfur dioxid and water to waste liquor obtained by previous boiling, and using the waste liquor thus prepared for boiling another quantity of wood, substantially as and for the purpose set forth.

4. In the process of boiling sulfite cellulose, a method consisting in adding a basic agent, sulfur dioxid and water to waste liquor obtained by previous boiling, using the waste liquor thus prepared for boiling another quantity of wood, and repeating said operations until the waste liquor has attained the desired concentration with reference to the substances dissolved, substantially as and for the purpose set forth.

5. In the process of boiling sulfite cellulose, a method consisting in washing the pulp with water, adding a basic agent, sulfur dioxid, and the washing-water to waste liquor obtained by previous boiling, and using the waste liquor thus prepared for boiling another quantity of wood, substantially as and for the purpose set forth.

6. In the process of boiling sulfite cellulose, a method consisting in washing the pulp with water, adding a basic agent, sulfur dioxid, and the washing-water to waste liquor obtained by previous boiling, using the waste liquor thus prepared for boiling another quantity of wood, and repeating the said method until the waste liquor has attained the desired concentration with reference to the substances dissolved, substantially as and for the purpose set forth.

In testimony that I claim the foregoing as my invention, I have signed my name in presence of two subscribing witnesses.

ERIK ÖMAN.

Witnesses:
K. E. WIBERG,
JOHN DELMAR.